Patented Mar. 10, 1925.

1,529,228

UNITED STATES PATENT OFFICE.

GEORGE WITTY, OF BROOKLYN, NEW YORK, ASSIGNOR OF ONE-HALF TO NICHOLAS SELVAGGI, OF BROOKLYN, NEW YORK.

CEMENT COMPOSITION.

No Drawing. Application filed February 11, 1924. Serial No. 692,171.

*To all whom it may concern:*

Be it known that I, GEORGE WITTY, a citizen of the United States, residing at Brooklyn, in the county of Kings and State of New York, have invented a new and useful Improvement in Cement Composition; and I do hereby declare the following to be a full, clear, and exact description of the invention.

The object of the invention is to provide an improved cement which will be hard, fire-proof, sound-proof, waterproof and a non-conductor of heat, sound and electricity; and provide further a cement which may be worked smooth or rough-surfaced, and which also may be polished, or given a color or tint.

A further object is to provide a cement composition which will be cheap to manufacture and adapted for shipment in dry powder form to be mixed with water for use.

My invention consists of a mixture of crude gypsum, marble dust or coarse silica, hard wood saw-dust, dextrin, barium sulphate and barite. In preparing the cement I prefer to use the ingredients thoroughly mixed and in about the following proportions: 40 pounds crude gypsum, 20 pounds marble dust or coarse silica, 20 pounds dextrin, 10 pounds hard-wood saw-dust, 5 pounds barium sulphate, 5 pounds barite; total 100.

From experience I have found that barium sulphate when used alone without the addition of the barite results in a quick setting product; when used with the other ingredients of my composition while with the addition of barite a retardation in the setting is produced thereby affording opportunity of applying the composition. Furthermore, the addition of the natural barite tends materially to retain the barium sulphate "an artificial product" in suspension whereby the homogeneous mixture of the barium sulphate with the barite and other ingredients is obtained. Dextrin is used as a binder and not a retarder and the addition of saw-dust produces a better binder and when combined with barite is rendered fire-proof.

My improved cement can be used for floor covering, artificial marble, insulating or deadening, artificial tile and other kinds of casting ornamental work.

Having fully described my invention what I claim as new and desire to secure by Letters Patent is:

1. A cement composition consisting of gypsum, coarse silica, dextrin, saw-dust, barium sulphate and barite.

2. A cement composition eight parts by weight of gypsum, four parts by weight of coarse silica, four parts by weight of dextrin, two parts by weight of hardwood saw-dust, and one part of each by weight of both barium sulphate and barite.

In testimony whereof, I have hereunto signed my name to this specification.

GEORGE WITTY.